V. E. NELSON.
METALLIC PACKING.
APPLICATION FILED FEB. 24, 1913.

1,223,605.

Patented Apr. 24, 1917.

WITNESSES.
Silene McDonald
Richard Alspas.

INVENTOR.
VICTOR E. NELSON
By Charles E. Kisner
Attorney.

UNITED STATES PATENT OFFICE.

VICTOR E. NELSON, OF DETROIT, MICHIGAN, ASSIGNOR OF FORTY-NINE ONE-HUNDREDTHS TO ALFRED T. HARROW, OF DETROIT, MICHIGAN.

METALLIC PACKING.

1,223,605.     Specification of Letters Patent.     Patented Apr. 24, 1917.

Application filed February 24, 1913. Serial No. 750,118.

*To all whom it may concern:*

Be it known that I, VICTOR E. NELSON, a citizen of the United States, residing at Detroit, county of Wayne, State of Michigan, have invented a certain new and useful Improvement in Metallic Packing, and declare the following to be a full, clear, and exact description of the same, such as will enable others skilled in the art to which it pertains to make and use the same, reference being had to the accompanying drawings, which form a part of this specification.

This invention relates to metallic packing for use with shafts and the like in a manner hereinafter described and has for its object a simple, efficient and inexpensive packing in which wear is automatically compensated for and the tight-joint continuously preserved, which is readily assembled, and adjustable means provided for retaining the packing in position.

The packing rings here shown are fully described in U. S. Patent No. 1,120,400, of December 8, 1914, to myself and Reynold G. Nelson, and the particular features of the invention herein disclosed relate to the use of an adjustable seat for the rings and in combination therewith reducing the cost of manufacture and assembling the packing in position as hereinafter more fully described and claimed.

In the accompanying drawings—

Similar characters refer to similar parts throughout the drawings and specification.

Figures 1, 2:
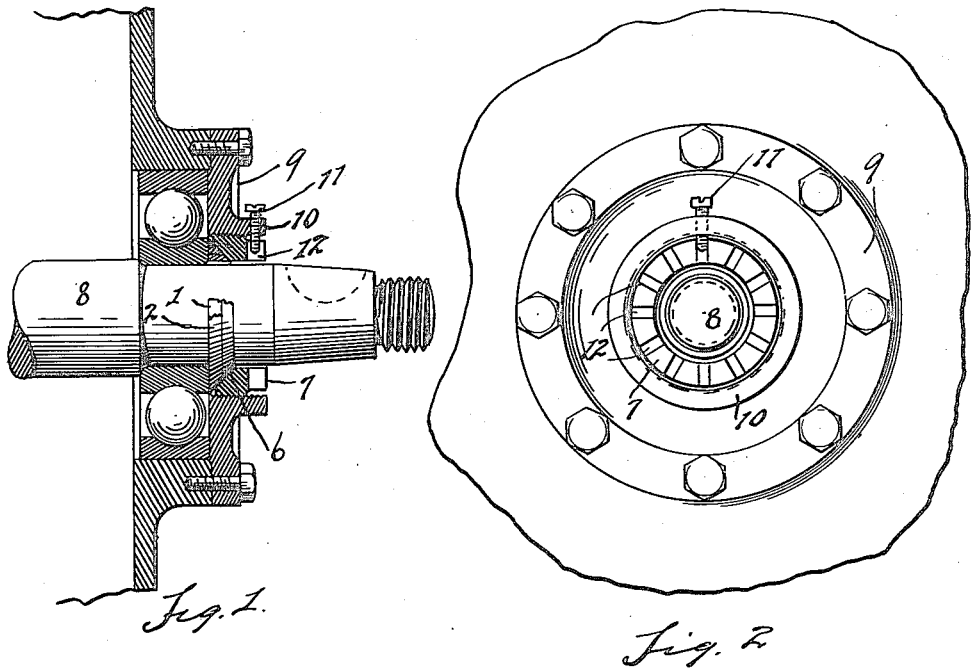
Figure 1 is a vertical section of part of a crank case of an internal combustion engine showing the packing rings in position on the crank shaft.
Fig. 2 is an end view thereof showing the means employed in adjusting the seat for the rings.
Figures 3, 4:
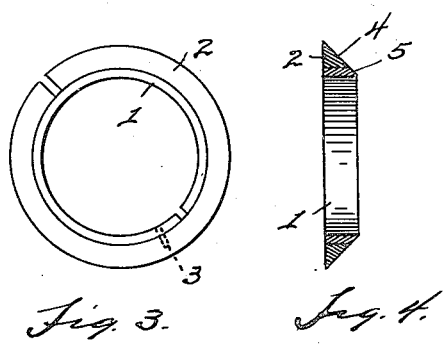
Fig. 3 is a plan view of the rings.
Fig. 4 is a vertical section thereof.

As described in said Patent No. 1,120,400, the packing preferably consists of a pair of split, concentric rings of spring metal both of which have a tapered surface engaging a seat, the inner ring 1 being preferably less in width than the outer ring 2 and the two rings secured together at a single point by a pin 3 in such manner that the open ends of the rings are not adjacent to each other. A surface 4 and 5 of each of the rings is preferably formed at an angle of substantially 45 degrees, shown more clearly in Fig. 4, and these two surfaces are so arranged as to form a continuous cone surface engaging a seat 6 of like angularity, less in diameter than the outer diameter of the rings, formed in the adjusting nut 7 as shown in Fig. 1. In assembling the rings in position on the seat, they are necessarily compressed in which condition there is a constant tendency for the rings to expand and therefore to ride out on the seat against the face of the surface it is desired to pack.

As shown in said United States Patent No. 1,120,400, the rings are held in place by, and the seat therefor is formed in, the plate usually provided for holding the ball race in position, and in practice it has been found that the machining preparatory to assembling the parts must be somewhat carefully performed in order to produce the best results and also that after a time the wear becomes sufficiently great to allow leakage.

By providing the tapered seat for the rings in the adjusting nut 7 encircling the shaft 8, the parts may be adjusted for wear and it is not necessary that the depth of the seat be made to exactly conform to the length of the rings as the seat may be so adjusted that the rings may properly engage the surface desired to be packed. As is shown more particularly in Fig. 1, the depth of the seat 6 is less than the greatest length of the rings sufficient to allow for considerable adjustment to be made, and the bearing is as effectually packed as in the former application, or sufficiently so for all practical purposes, as the only leakage that may occur will be on the line of the threads of the nut.

To support the nut, the plate 9 for holding the ball-races in place is centrally apertured and threaded to receive the adjusting nut 7 through which the shaft 8 passes, and this plate 9 is provided with a laterally projecting circumferential flange 10 about the aperture. A retaining screw 11 is threaded in the flange and engages in one of the slots 12 with which the outer face of the nut 7 is provided thus retaining it in its adjusted position and there are a number of these slots provided in order that a slight adjustment may be made if desired.

While I have shown and described the packing as adapted for use with the crank shaft of an engine, it is to be understood that the packing may be employed in a great variety of places as, for instance, about the shaft in transmission gear cases to prevent a leakage of oil, or in the differential case on the rear axle of automobiles, etc., or wherever a packing of this nature is of utility in the preventing escape of oil, gas or other fluid.

It is to be noted that the efficiency of this packing is nowise dependent upon the packing rings or the adjusting nut engaging the shaft as they may be entirely free therefrom, as shown in Fig. 1, without detriment to the effectiveness of the packing as all leakage is prevented by reason of the flat face of the packing tightly engaging one of the ball-races or surface to be packed and the tapered face thereof tightly engaging the tapered surface of the seat.

While I have shown a pair of split, concentric, spring metal rings, as the preferred form of the packing, it is to be understood that a single ring may be used in place thereof, as is set forth in said pending application, without departing from the spirit of this invention, and also, that while the packing is shown as adapted for use in a boxing or housing embodying balls and ball-races, the housing may be of other forms or types provided with a portion against which the spring ring or rings engage, especially with shafts or rods that do not have a rotary motion.

Having thus briefly described my invention, what I claim and desire to secure by Letters Patent of the United States is—

1. In a metallic packing for rods, shafts and the like, a split spring metal ring having a tapered outer surface, and an adjustable seat for said ring having a like tapered surface less in diameter than the normal diameter of the tapered surface of the ring, the depth of the seat being less than the length of the ring to allow for adjustment.

2. A metallic packing for rods, shafts and the like comprising a boxing or housing for the shaft, a pair of split, concentric, spring metal rings, the outer surface of each ring being tapered to jointly provide a single uniform cone surface, a retainer encircling the shaft and threaded in the housing, the retainer being provided with a seat for the rings having a tapered surface less in diameter and length than the tapered surface of the rings.

3. A metallic packing for rods, shafts and the like comprising in combination with a housing for the shaft, an apertured plate for the housing through which the shaft extends, a retainer encircling the shaft and threaded in the housing having a tapered or cone shaped seat on the inner end thereof, a split spring metal ring having a tapered outer surface the normal diameter of which is greater than the diameter of the seat, and means on the shaft against which the ring may engage, the length of the cone surface of the ring being greater than the length of the cone surface of the seat.

4. A metallic packing for rods, shafts and the like comprising in combination a boxing or housing for the shaft, an apertured plate forming a closure for the housing and through which the shaft may project, a retainer threaded in the aperture and having a tapered seat on the inner end, a pair of split concentric spring metal rings, the outer surface of both rings being tapered to provide a uniform cone surface the normal diameter of which is greater than the diameter of the tapered seat, and means on the shaft to prevent the rings from riding out of the seat, the length of the tapered surface of the seat being less than the length of the cone surface of the two rings.

5. In a metallic packing for rods, shafts and the like, a split spring metal ring having a tapered outer surface, and an adjustable seat for the ring having a like tapered surface less in diameter and less in length than the tapered surface of the ring, the inner diameter of the ring when seated being greater than that of the rod about which it is positioned.

6. In a metallic packing for rods, shafts and the like, a pair of split, concentric, spring metal rings the outer surface of which is uniformly tapered to provide a single uniform cone surface, and an adjustable seat for said rings having a like tapered surface less in length and diameter than the engaging surface of said rings, the inner diameter of the inner ring when seated being greater than the diameter of the shaft about which it is positioned, and means on the shaft for preventing the rings from riding out of the seat.

7. In a metallic packing for rods, shafts and the like, the combination with a housing therefor, the shaft or rod being provided with an enlargement in the housing, of a cover plate for the housing having a threaded aperture, a retainer threaded in the aperture, and a split spring-metal ring having a tapered or coned outer surface, the retainer having a like tapered seat for the ring less in diameter than the normal outer diameter of the ring and being adapted to position the ring relative to the enlargement of the shaft.

8. In a metallic packing for rods, shafts and the like, the combination with a housing therefor, the shaft or rod being provided with an enlargement in the housing having a plane surface at a right angle to the longitudinal axis of the shaft, of a cover plate for the housing the inner face of which is contiguous to the parallel face of the enlargement of a retainer apertured to receive the shaft and carried by the plate, a split spring metal ring having a tapered or coned outer surface, the retainer having a like tapered seat for the ring on the inner end thereof less in diameter than the normal outer diameter of the ring and being adjusted to maintain the ring in position to contact the plane surface of said enlargement on the shaft.

9. A metallic packing for rods, shafts and the like comprising a boxing or housing for the shaft or rod, said shaft being provided with an enlarged portion having a plane surface positioned at a right angle to the longitudinal axis of the shaft, a pair of split concentric spring metal rings, the outer surface of each ring being tapered to provide a single uniform cone surface, a retainer therefor threaded in the housing provided with a seat for the rings having a tapered surface less in diameter than the coned surface of the rings and providing a means to position the rings to engage the plane surface on a shaft, and means for securing the retainer in adjusted position.

In testimony whereof I sign this specification in the presence of two witnesses.

VICTOR E. NELSON.

Witnesses:
 ALFRED T. HARROW,
 CHARLES E. WISNER.